May 22, 1962
J. RYWAK
3,036,227
MONO-STABLE CIRCUIT HAVING RESISTIVELY CROSS-COUPLED BISTABLE FLIP-FLOP
Filed Jan. 28, 1960
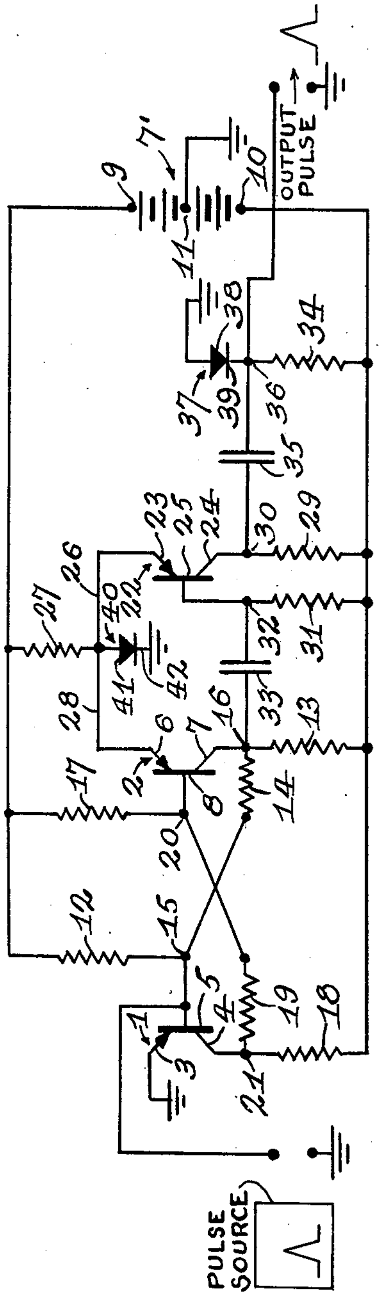
Inventor
JOHN RYWAK
By Robert B. Harmon
Attorney 3,036,227
Patented May 22, 1962

3,036,227

MONO-STABLE CIRCUIT HAVING RESISTIVELY CROSS-COUPLED BISTABLE FLIP-FLOP

John Rywak, Belleville, Ontario, Canada, assignor to Northern Electric Company, Limited, Montreal, Quebec, Canada, a corporation of Canada Filed Jan. 28, 1960, Ser. No. 5,247
4 Claims. (Cl. 307—88.5)

This invention relates to transistor circuits and more particularly to mono-stable multivibrator transistor circuits.

An inherent disadvantage of a mono-stable multivibrator circuit is its susceptibility to triggering by transient pulses. In vacuum tube circuits of this nature, this triggering action is not too servere due to the high voltages employed but in transistor circuits, where low voltages are employed, transient pulses of a given magnitude have a considerable greater effect than in the case where vacuum tubes are used. A method used to avoid this difficulty is to decouple the feedback loop sufficiently to make triggering less likely but in this method the circuit is also made less sensitive to the driving trigger which may not be desirable.

An object of this invention is to provide a transistor mono-stable multivibrator circuit having means to prevent its operation by transient pulses.

It is a further object of this invention to provide a transistor mono-stable multivibrator circuit utilizing low voltages encountered in transistor circuits.

These and other objects are attained in one embodiment of the invention by providing a mono-stable multivibrator transistor circuit comprising in combination: a circuit, having a first and a second semi-conducting device each of which are provided with a base, emitter and collector electrodes, and a third transistor device having a base, emitter and collector electrodes, coupled to the second device, the coupling of the three devices being such that the third device controls the activation of the second device so that the latter functions as a buffer transistor between the first and third device, and the three devices as a mono-stable multivibrator circuit.

A better understanding of the invention may be attained by referring to the following description, taken in conjunction with the single drawing in which there is shown:

A first and second p-n-p transistor 1 and 2, each having an emitter, collector and base electrodes 3, 4, 5 and 6, 7, 8; a source of potential 7' grounded at the junction point 11; having terminals 9, 10 connected to the positive and negative potential source respectively; a first resistor 12 connected to the terminal 9 of source 7' and to the base electrode 5 of transistor 1, a second resistor 13 connected to the terminal 10 of potential source 7' and to the collector electrode 7 of transistor 2, a third resistor 14 connected between resistors 12, 13 so as to form the points of reference potentials 15, 16 and a fourth resistor 17 connected to terminal 9 of source 7' and to the base electrode 8 of transistor 2, a fifth resistor 18 connected to terminal 10 of source 7' and to the collector electrode 4 of transistor 1, a sixth resistor 19 connected between resistors 17, 18 so as to form points of reference potentials 20, 21, resistors 12, 14, 13 and 17, 19, 18 forming the biasing circuits for transistors 1 and 2, respectively.

Also illustrated in the drawing is a third p-n-p transistor 22, having an emitter, collector and base electrodes 23, 24, 25, respectively, the emitter electrodes 6 and 23 being connected together by conductor 26; a seventh resistor 27 connected to terminal 9 of source 7' and to conductor 26 at the junction point 28, an eighth resistor 29 connected to terminal 10 of source 7' and to collector

24 of transistor 22 at the point of reference potential 30, these resistors 27, 29, forming part of the biasing circuit for transistor 22; a ninth resistor 31 connected to terminal 10 of source 7' and to the base electrode 25 of transistor 22 to form the point of reference potential 32; this resistor 31 forming the other part of the biasing circuit for transistor 22, as well as part of the leakage path for capacitor 33 connected between the points of reference potentials 16, 32. Potentials 28, 30 and 32 are essentially the same, slightly below ground because during standby transistor 22 is saturated.

Also shown in the drawing is a pulse forming network consisting of resistors 29, 34, capacitor 35, connected between the reference points 30, 36, diode 37 having its cathode 38 connected to the reference point 36 and its anode 39 to ground, this diode 37 providing a charging and discharging path for capacitor 35 when transistor 22 is cut off and made conducting respectively.

An additional diode 40 having its anode 41 connected to the conductor 26 and its cathode 42 connected to ground functions as a clamp to ground and thereby prevents transient pulses being transmitted back in a regenerative way from emitter 23 to emitter 6 of transistors 22 and 2 respectively.

Representative values of the resistors and capacitors employed in the circuit are:

| | |
|---|---|
| Resistors: | |
| 12, 17 | 150K |
| 27 | 3.9K |
| 12, 13, 29, 17, 18 | 3.3K |
| 14 | 33K |
| 19 | 22K |
| 31 | 56K |
| 34 | 120K |
| Capacitors: | |
| 33 | .02 mf. |
| 35 | .01 mf. |

The following is the operation of the circuit:

*Standby Condition*

In this condition, the circuit 9—12—15—14—16—13—10—9 is completed so that a forward bias is applied to the base electrode 5 of transistor 1 which conducts. Transistor 22 due to its biasing circuit also conducts.

When transistor 1 conducts the circuit 3—5—4—21—18—10—11—ground is completed establishing a potential at the reference point 21 at about ground potential, and the circuit 9—17—20—19—21—18—10—9 holds the point of reference potential 20 at a positive potential with respect to reference point 21 and ground. When transistor 22 conducts the circuit 9—27—28—26—23—25—24—30—29—10—9 is completed so that the potential of the reference point 28 and emitter 6 of transistor 2 is at slightly below ground potential. Transistor 2 is therefore cut off.

Should transistor 22 be momentarily cut off, as by a positive going transient pulse appearing at its base electrode 25, while the circuit is in the standby condition, the potential at the emitter electrodes 6 and 23, of transistors 2 and 22 respectively, cannot rise above the ground potential due to the clamping action of diode 40. Transistor 2, therefore, remains cut off during the standby condition. Unidirectional device 40 performs this clamping function only during transient triggering described above. During normal operation device 40 remains reverse biased and does not influence the operation of the circuit.

Since transistor 1 is conducting during this condition, the circuit 3—5—15—14—16—13—10—11—ground is completed which establishes the point 16 of reference potential at relatively large negative potential relative to the smaller potential at reference point 32, the latter being equal to that of emitter electrode 23 of transistor 22 which, as described heretofore, is at slightly negative potential. Capacitor 33 therefore charges during the standby condition.

*Triggered Condition*

When a positive pulse is applied to the base electrode 5 of transistor 1, this transistor is cut off so that the potential of the reference point 21 falls removing the positive potential from the base electrode 8 of transistor 2, causing this transistor to conduct.

When transistor 2 conducts, the negative potential at reference point 16 rises which causes a corresponding increase of the potential at reference point 32, the difference in potential between these two points applying a reverse bias to the base electrode 25 of transistor 22 over the circuit 32—25—23—26—28—6—8—7—16 causes this transistor 22 to cut off. With the higher potential of the reference point 16, the current flowing through circuit 9—12—15—14—16—13—10—9 will hold the potential at the reference point 15 and the base electrode 5 of transistor 1 at a positive value with respect to the potential at reference point 16 and hence ground. This action will hold transistor 1 cut off after the termination of the application of the triggering pulse.

When transistor 22 is conducting in the standby condition, the potential of reference point 30 is at a slightly negative potential and when transistor 22 is cut off the potential at this point 30 falls permitting capacitor 35 to be charged over the circuit ground—39—38—36—35—30—29—10—11—ground so that the potential at reference point 36 is at nearly ground.

When transistor 22 is cut off, the potential of reference point 32 is no longer held at a small negative potential, and capacitor 33 therefore discharges over the circuit 32—31—13—16 until the potential at 32 is such that transistor 22 becomes conducting again.

When transistor 22 becomes conducting, the potential of reference point 30 returns to a condition where it is at a slightly negative potential. Because of the charge that has been stored in capacitor 35, the potential of 36 now rises above ground causing diode 37 to be reverse biased so that the capacitor 35 discharges through resistor 29 and 34 giving rise to a positive output pulse between the reference point 36 and ground.

A novel aspect of the mono-stable circuit described is that it is relatively free from loading effects since the collector potential of transistor 22 is not associated with the feed-back loop of the circuit. The circuit tolerance against transients may be shown by the expression $$Vm=\frac{ER_2}{\beta_1R_3-R_2}\left[\frac{\beta_1R_3}{R_1}-\frac{R_5+R_3}{R_4}\right]$$

where "V$m$" is the voltage margin of the transients below ground when they appear in the negative power supply, $\beta_1$ the collector-base current amplification of the first transistor, $R_1$=resistor 12
$R_2$=resistor 14
$R_3$=resistor 18
$R_4$=resistor 17
$R_5$=resistor 19
$E$ the positive voltage supply.

It is understood that as above described monostable circuits also can employ NPN transistors when suitable alterations are made in the polarities of the power source at terminals 9 and 10, the unidirectional devices 40 and 37, and the input trigger.

What is claimed is:

1. A mono-stable transistor circuit comprising in combination two semi-conductor devices having the circuit configurations of a bi-stable multivibrator, consisting of a first and second semi-conducting device each having a base, emitter and collector electrode; a source of potential; a first resistor connected to a first terminal of the source, poled to apply a predetermined polarity thereto, and to the base electrode of the first device, a second resistor connected to the other terminal of the source and to the collector electrode of the second devices, a third resistor connected between the first and second resistor, a fourth resistor connected to the first terminal of the source and to the base electrode of the second device, a fifth resistor connected to the other terminal of the source and to the collector electrode of the first device, a sixth resistor connected between the fifth and fourth resistor; a third semiconducting device having a base, emitter and collector electrode; connecting means for directly connecting to emitter electrode of the second and third device together; a seventh resistor connected to the first terminal of the source and to the connecting means, an eighth resistor connected to the other terminal of the source and to the collector electrode of the third device; a capacitor connected between the collector and base electrode of the second and third device respectively; a ninth resistor connected to the other terminal of the source and to the base electrode of the third device; means to apply a triggering pulse to the input of the first device.

2. A mono-stable transistor circuit in accordance with claim 1 having in combination therewith: a unidirectional device having its anode connected to the said connecting means and its cathode connected to ground.

3. A mono-stable transistor circuit in accordance with claim 2 having in combination therewith a pulse forming network connected to the output of the said third transistor.

4. A mono-stable transistor circuit in accordance with claim 3 in which said network comprises an additional resistor having one terminal connected to the other terminal of the source, a capacitor connected between the collector electrode of the third transistor and the other terminal of the additional resistor, a diode having its anode connected to ground and its cathode to the other terminal of the additional resistor.

References Cited in the file of this patent

UNITED STATES PATENTS

| | | |
|---|---|---|
| 2,837,663 | Walz | June 3, 1958 |
| 2,841,712 | Hoge | July 1, 1958 |
| 2,933,625 | Townsend | Apr. 19, 1960 |
| 2,939,969 | Kwap | June 7, 1960 |
| 2,949,582 | Silliman | Aug. 16, 1960 |

OTHER REFERENCES

"Pulse and Digital Circuits" by Millman and Taub, McGraw-Hill 1956, page 120.